United States Patent [19]

Feinbloom

[11] Patent Number: 4,859,032
[45] Date of Patent: Aug. 22, 1989

[54] HAND-HELD MAGNIFIER APPARATUS

[75] Inventor: Richard E. Feinbloom, New York, N.Y.

[73] Assignee: Designs for Vision, Inc., Ronkonkoma, N.Y.

[21] Appl. No.: 182,212

[22] Filed: Apr. 15, 1988

[51] Int. Cl.[4] .............................................. G02B 27/02
[52] U.S. Cl. .................................................... 350/235
[58] Field of Search .............. 350/235, 236, 237, 433, 350/399; 362/268, 311

[56] References Cited

U.S. PATENT DOCUMENTS

| 2,087,081 | 7/1937 | Book | 350/237 |
| 2,092,672 | 9/1937 | Hyatt | 350/235 |
| 2,619,004 | 11/1952 | O'Brien et al. | 350/238 |
| 3,567,309 | 3/1971 | Jasgur | 350/349 |

Primary Examiner—Bruce Y. Arnold
Assistant Examiner—J. P. Ryan
Attorney, Agent, or Firm—Arthur L. Plevy

[57] ABSTRACT

There is disclosed a hand-held magnifying apparatus which employs a lens assembly housing. The housing has first and second magnifying lenses located therein whereby the lenses can be adjusted to obtain a variable focal length. The housing is terminated at one end in a cylindrical hooded section which has coupled thereto an angled power source accommodating section. The power source accommodating section includes a source of illumination and cylindrical condensing lenses which operate to condense the light pattern from the illumination source and to change the light pattern from an elliptical to a circular pattern to thereby uniformly illuminate the text or material to be viewed via the magnifying lens assembly.

12 Claims, 2 Drawing Sheets

HAND-HELD MAGNIFIER APPARATUS

BACKGROUND OF THE INVENTION

This invention relates to magnifying apparatus and more particularly to a hand-held magnifier apparatus incorporating a built-in source of illumination.

As one will ascertain, the prior art is replete with numerous patents and other materials, which show magnifying lens systems to enable a person to view objects more clearly. As is well known, with the aid of a magnifying glass or a microscope it is possible to bring the object very close to the eye and yet view it as though it were comfortably within the eyes range of accommodation. This is the range of distance within which it can produce a sharply focused image on the retina.

As is also well known, the magnifying power of a microscope or a magnifying glass is the ratio of the apparent size of the image of an object formed by the instrument to that of the object seen by the naked eye. Various optical aids have been used to enable close viewing. Many of these optical aids come with a built-in light source which enables one to utilize the magnifying glass or the microscope assembly to view various items or objects with the additional light source illuminating the field of view.

Such prior art magnifiers present many problems in regard to the nature of the illumination in regard to glare which is caused by the source of illumination and while in general are effective to provide magnification there are various problems associated with the apparatus. As indicated, many of these problems result in glare which emanates from the illumination source as well as uneven illumination of the object to be viewed via the magnifying system.

It is therefore an object of the present invention to provide an improved magnifying system which essentially is economical to manufacture while eliminating many of the above-noted problems associated with the prior art devices.

BRIEF DESCRIPTION OF THE PREFERRED EMBODIMENT

A magnifying apparatus, comprising a first housing section having a top portion for containing at least one magnifying lens assembly with a top opening to enable a person to view via said lens, said housing having a bottom opening surrounded by a peripheral wall, a second housing section coupled to said peripheral wall at an angle thereto and containing a source of illumination adapted to transmit a beam of light, and means located in said second housing section for shaping said beam so that a circular pattern of light is provided about said bottom opening of said first housing section.

DETAILED DESCRIPTION OF THE FIGURES

Figure 1:
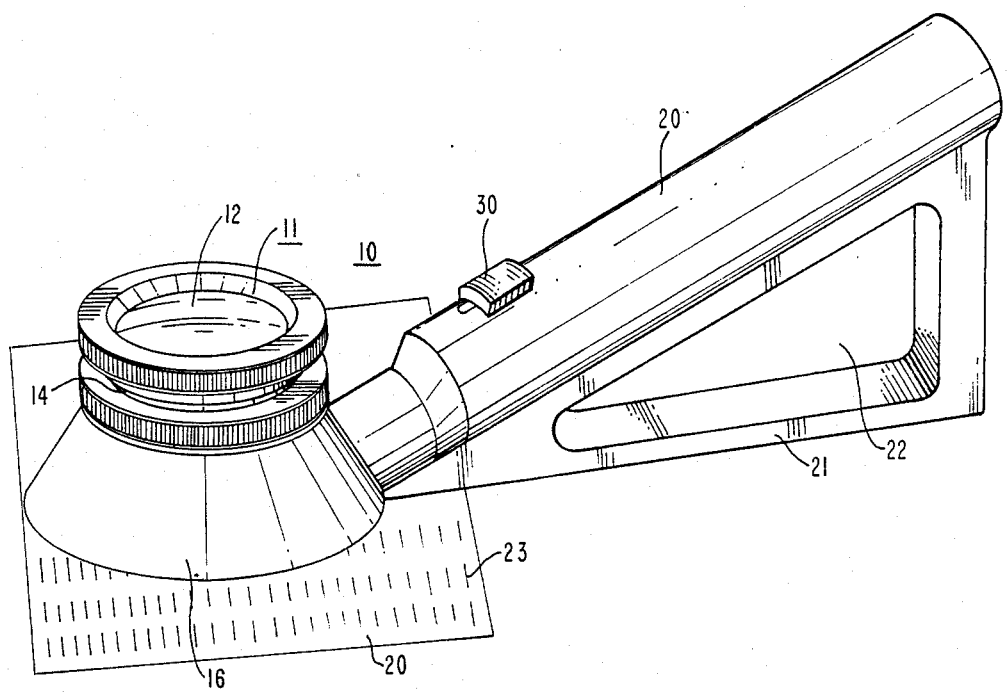
FIG. 1 is a perspective plan view of a hand-held mangifying apparatus according to this invention.

Referring to FIG. 1, there is shown a hand-held magnifying apparatus 10 according to this invention.

As seen from FIG. 1, the apparatus consists of a first housing section or a magnifying housing section 11 which as will be described includes two magnifying lenses which are adjustable or moveable to allow one to vary the focal length as desired. The magnifying assembly which consists of a top magnifying lens 12 and an internal magnifying lens (not shown) are located in the composite housing 11. The composite housing 11 has a bottom section 14 with a bottom opening surrounded by a hooded section 16. The top lens 12 and a bottom lens are retained within the top housing section to enable a user to view the object through the lens system contained in the housing. As seen from FIG. 1, the bottom housing section 14 terminates in a cylindrical hooded section 16. The section 16 can be placed directly on a sheet of paper 25 or other item whereby the text on the paper as 23 can be viewed via the lens system. Also shown coupled to the magnifying housing assembly 11 is an angled tubular housing section 20. The tubular housing section 20 is associated with a triangular shaped handle 21 having an aperture 22 to enable a person to easily grip the apparatus. The tubular housing section 20 contains an illumination source for directing light into the cylindrical hooded section 16.

The top portion of the housing 20 is circular in configuration and contains for example a battery supply. As will be explained, the source of light for this particular device may be afforded by means of a typical battery pack and a bulb as forming a conventional flash light assembly or may be a fiber optic bundle which is directed into the hooded portion 16 of the magnifying housing section 14.

Figure 2:
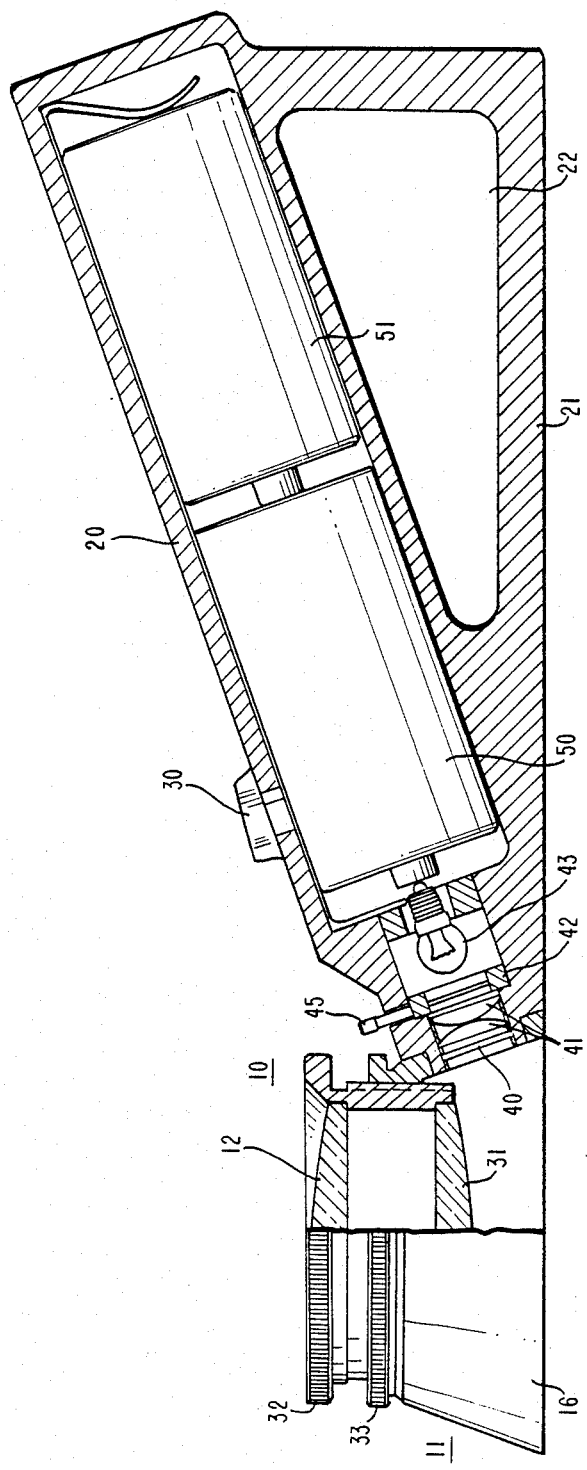
FIG. 2 is a partial cross-sectional view of the apparatus of FIG. 1.

Referring to FIG. 2, there is shown a partial cross-sectional view of the hand-held magnifier apparatus of FIG. 1. The same reference numerals are retained to identify similar functioning parts. As seen in FIG. 2, the magnifying housing assembly 11 consists of a top housing section 32 which is movable with respect to a bottom section 33. One magnifying lens 12 is secured near the top of housing section 32 and the other lens 31 is secured to the bottom of housing 32. The housing section 32 moves up and down with respect to housing section or portion 33 to allow the lenses 12 and 31 to move int he vertical plane, to thereby afford the ability to focus. The movement is accommodated by means of a threaded arrangement or any other arrangement whereby one can vary the focus of the optical system. The lens 31 which is the bottom lens is secured near the bottom of housing section 32 and due to the coupling of housing 32 to 33 by means of a threaded arrangement or otherwise one can now vary the focal length of the entire optical system. This is accomplished by moving lenses 12 and 31 in the vertical direction as up and down due to the movement of housing section 32 with respect to housing section 33.

A typical magnifying assembly which is accommodated by lenses 12 and 31 will have an effective magnification between 32 to 64 diopters or 8 to × magnification. The lens system has a short focal length because of the magnification necessary but the diameter of both lenses is relatively large to obtain a large field of view. Typical dimensions of the lenses may be about 2 inches in diameter. As seen in FIG. 2, the bottom section or circular section 16 of housing 11 surrounds the bottom lens assembly 31 and makes for a light-tight enclosure. Coupled to the section 16 as shown in FIG. 1 is the tubular assembly 20 containing the light source. In FIG. 2, the light source assembly operates similar to a flash light and contains two batteries 50 and 51 within the internal recess of the tubular housing section 20. Coupled and integrally formed with the tubular housing section 20 is the handle 21 having the triangular shaped aperture 22. It is noted that the handle 21 serves a dual purpose in enabling one to grasp or hold the entire mechanism and therefore manipulate it as desired and further serves as a support to enable the mechanism to rest on a surface as for example shown in FIG. 1.

The light source assembly which is energized by means of the batteries 50 and 51 is coupled to a conventional lamp 43. The lamp 43 projects light through a diaphragm assembly 42. The diaphragm assembly 42 is a typical camera-type diaphragm and is manipulated by means of the lever assembly 42. Such diaphragm assemblies are well known. Thus, one can adjust the diaphragm to allow a predetermined beam of light to enter the hooded section 16 of the housing 11. The amount of light as controlled by the diaphragm is first directed through two condensing lenses 41. These lenses which are shown as two may only be one lens but essentially are plus cylindrical lenses which are positioned in the tubular housing 20 at predetermined angles. The function of the lenses 41 is to condense the light so that it illuminates a given area as for example that area contained and enclosed within the hooded cylindrical section 16 of the magnifying housing assembly 11. The condensing lenses 41 are then followed by a polarizing plate or filter 40. The polarizing plate 40 polarizes the light from source 43 so that it is polarized in a single direction to substantially prevent glare. As shown, there is a switch 30 associated with the housing section 20. The switch 30 is an on and off switch and may also include an intensity control as a potentiometer and so on. In this manner the switch 30 can operate to control the intensity of the light as is conventionally known.

Figure 3:
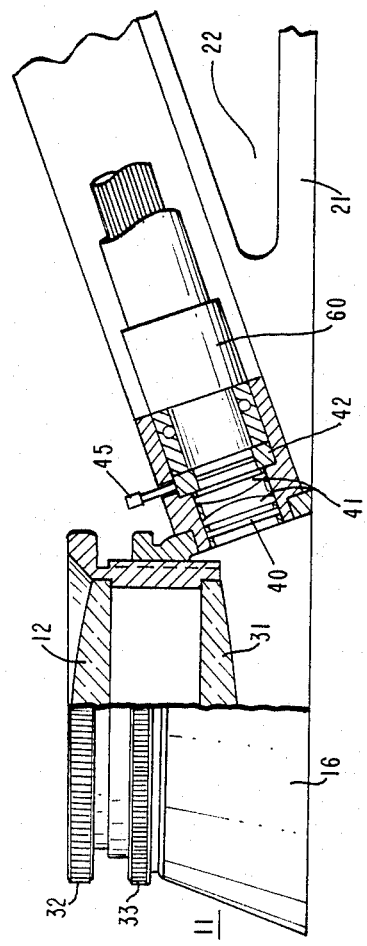
FIG. 3 is a partial cross-sectonal view of an alternate embodiment of the invention.

Referring to FIG. 3, there is shown a hand-held magnifying apparatus which operates identically to that shown in FIG. 2 but which is illuminated by means of an optical cable or optical bundle assembly 60 in lieu of a battery pack as is shown in FIG. 2. It is immediately understood that the means of energizing the light source or the means for providing the light source is understood by those skilled in the art and many alternate embodiments can be employed.

As is understood from the above, a single condensing lens or a pair of condensing lenses are employed. The axes of the lenses are chosen in a particular manner as will be explained. The main function of the condensing lenses is to condense the beam of light so that it can be controlled to provide an optimum pattern. Without lenses light which emanates from source 43 will be brighter near the input than at the output as it provides a diffused pattern.

Figure 4:
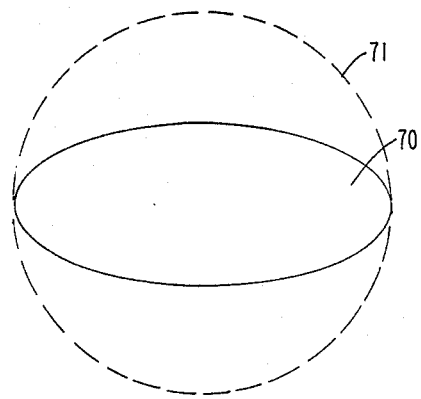
FIG. 4 is a diagrammatic view showing the light pattern which is afforded by this invention.

Referring to FIG. 4, it is immediately noted that light which emanates from the lamp 43 without the condensing lenses of this particular system will project an elliptical image 70. This elliptical image 70 will be projected on the object to be viewed and for many purposes will be sufficient in order to enable a person utilizing the system to view a text and so on. The elliptical projection 70 is extremely difficult to use and can produce a great deal of glare as well as producing a diffused elliptical light pattern. The function of the condensing lenses is to change the beam so that instead of projecting an elliptical pattern 70, it projects a circular pattern 71 which fills the entire area of the hooded section 16 of the assembly 14. The axis of each cylindrical or a single cylindrical lens is set at 90° with respect to the horizontal. This converts the normal elliptical projection 70 to a circular projection 71.

The circular pattern or image 71 therefore assures uniform illumination for the lens system thereby providing the user with a uniformly illuminated background enabling him to view the object with reliability. It is also understood that by employing an elliptical aperture in the diaphragm, one could generate a circular image by using spherical condensing lenses in conjunction with an elliptical shaped diaphragm aperture.

The above apparatus solves many of the problems of the prior art as will be immediately ascertained. The above apparatus as described utilizes plus cylindrical lenses which are arranged to convert an otherwise elliptical image into a circular image to therefore uniformly illuminate the surface of the object being viewed through the magnifying lens system. The assembly is integrally formed within a hand-held housing arrangement while providing a variable focal capability by means of housing sections 32 and 33. In this manner the lens assembly can move up and down in the vertical plane. The apparatus utilizes a diaphragm so that one can control the beam size before the light enters the condensing lens assembly. The system also employs a polarizer or polarizing plate to substantially reduce glare which would ordinarily occur due to the reflections from the object being viewed.

I claim:

1. A magnifying apparatus, comprising:
   a first housing section having a top portion for containing at least one magnifying lens assembly with a top opening to enable a person to view via said lens, said housing having a bottom opening surrounded by a peripheral wall,
   a second housing section coupled to said peripheral wall at an angle thereto and containing a source of illumination adapted to transmit a beam of light, and
   means located in said second housing section for shaping said beam so that a circular pattern of light is provided about said bottom opening of said first housing section when said first housing section is placed on a flat surface to completely cover said bottom opening.

2. The apparatus according to claim 1, wherein said first housing section includes a top section containing said one magnifying lens and a bottom section, with said top and bottom sections adjustably coupled one to the other to enable a user focus said lens.

3. The apparatus according to claim 1, wherein said second housing section includes a handle section coupled thereto which handle section enables a user to grip said apparatus while further serving to support said apparatus when said apparatus is placed on a horizontal plane.

4. The apparatus according to claim 1 further including an adjustable diaphragm member located in said second housing section and operative to vary the diameter of said beam of light.

5. The apparatus according to claim 1, wherein said source of illumination is a light bulb.

6. The apparatus according to claim 5, further including polarizing means located in said second housing section and operative to polarize said beam of light prior to directing the same about said bottom opening.

7. The apparatus according to claim 1, wherein said source of illumination is a fiber optic cable.

8. The apparatus according to claim 1, wherein said means for shaping said beam is a cylindrical lens assembly and located in said second housing with the axis oriented to provide said circular pattern.

9. The apparatus according to claim 8, wherein said cylindrical lens assembly is a plus cylindrical lens having its axis at 90° with respect to the horizontal.

10. The apparatus according to claim 1, wherein said means for shaping said beam includes a diaphragm having an elliptical aperture followed by a spherical lens assembly for converting said light beam as directed through said elliptical aperture to said circular pattern.

11. The apparatus according to claim 1 wherein said first housing section includes a second lens positioned near said bottom opening and operative to form a magnifying assembly with said one magnifying lens.

12. The apparatus according to claim 11, wherein said lenses provide a magnification between 8 to 16 X.

* * * * *